(12) United States Patent
Zhang

(10) Patent No.: US 10,230,407 B2
(45) Date of Patent: Mar. 12, 2019

(54) RADIO RECEIVER WITH HYBRID CHANNELIZER ARCHITECTURE

(71) Applicant: Hughes Network Systems LLC, Germantown, MD (US)

(72) Inventor: Hanhui Zhang, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 69 days.

(21) Appl. No.: 15/210,233

(22) Filed: Jul. 14, 2016

(65) Prior Publication Data

US 2018/0019831 A1    Jan. 18, 2018

(51) Int. Cl.
　　*H04B 1/00*　　(2006.01)
　　*H04L 5/00*　　(2006.01)

(52) U.S. Cl.
　　CPC ............ *H04B 1/001* (2013.01); *H04L 5/0005* (2013.01)

(58) Field of Classification Search
　　CPC ................ H04J 1/045; H04J 1/08; H04B 1/18
　　See application file for complete search history.

(56) References Cited

U.S. PATENT DOCUMENTS

| | | | |
|---|---|---|---|
| 5,428,814 A * | 6/1995 | Mort | ............... H04B 7/2046 333/101 |
| 5,835,487 A | 11/1998 | Campanella | |
| 6,157,621 A | 12/2000 | Brown et al. | |
| 6,463,279 B1 | 10/2002 | Sherman et al. | |
| 6,760,342 B1 | 7/2004 | Skones et al. | |
| 7,145,972 B2 | 12/2006 | Kumar et al. | |
| 7,454,175 B2 | 11/2008 | Karabinis | |
| 2003/0076907 A1 * | 4/2003 | Harris | ................ H03H 17/0273 375/350 |
| 2004/0205827 A1 | 10/2004 | Krone | |
| 2005/0118976 A1 * | 6/2005 | Murakami | ............... H04B 1/30 455/313 |

(Continued)

OTHER PUBLICATIONS

'Dspguru.com' [online]. "Digital Signal Processing Articles," Iowegian International, Feb. 2010, [retrieved on Feb. 16, 2017]. Retrieved from the Internet: URLhttp://dspguru.com/dsp/faqs/multirate/decimation. 1 page.

(Continued)

*Primary Examiner* — Brandon M Renner
*Assistant Examiner* — Jay L Vogel
(74) *Attorney, Agent, or Firm* — Fish & Richardson P.C.

(57) ABSTRACT

Methods, systems, and apparatus, including computer programs encoded on a computer storage medium, for a radio receiver with a hybrid channelizer architecture. In some implementations, a receiver includes an input to receive a first signal encoding digital samples of a radiofrequency signal. The receiver includes a frequency shifter configured to generate a second signal that is frequency shifted relative to the first signal. The receiver includes a first polyphase filter bank configured to receive the first signal and provide filter bank outputs for first sub-bands. The receiver includes a second polyphase filter bank configured to receive the second signal and provide filter bank outputs for second sub-bands. The receiver includes a switch network configured to select among the filter bank outputs and provide the filter bank outputs to respective digital channelizer modules for multiple channels.

18 Claims, 6 Drawing Sheets

(56) References Cited

U.S. PATENT DOCUMENTS

| | | | | |
|---|---|---|---|---|
| 2009/0319065 | A1* | 12/2009 | Risbo | G11B 20/10527 700/94 |
| 2012/0263163 | A1* | 10/2012 | Burzigotti | H04B 7/18515 370/344 |
| 2014/0314186 | A1* | 10/2014 | Chang | H04B 1/16 375/340 |
| 2017/0041065 | A1* | 2/2017 | Goettle, Jr. | H03F 1/0261 |

OTHER PUBLICATIONS

'Mrcy.com' [online]. "Polyphase Channelizer," Mercury Systems, May 2013, [retrieved on Feb. 16, 2017]. Retrieved from the Internet: URLhttps://www.mrcy.com/products/fpga-ip/EchoCore/polyphase_channelizer/. 1 page.

'Wikipedia.com' [online]. "Bandwidth (signal processing)," Apr. 2008, [retrieved on Feb. 16, 2017]. Retrieved from the Internet: URLhttps://en.wikipedia.org/wiki/Bandwidth_(signal_processing). 1 page.

'Wikipedia.com' [online]. "Multidimensional Multirate Systems," Aug. 2016, [retrieved on Feb. 16, 2017]. Retrieved from the Internet: URLhttps://en.wikipedia.org/wiki/Multidimensional_Multirate_Systems. 1 page.

'Wikipedia.com' [online]. "Multirate filter bank and multidimensional directional filter banks," Oct. 2016, [retrieved on Feb. 16, 2017]. Retrieved from the Internet: URLhttps://en.wikipedia.org/wiki/Multirate_filter_bank_and_multidimensional_directional_filter_banks. 1 page.

'Wikipedia.com' [online]. "Polyphase matrix," Sep. 2015, [retrieved on Feb. 16, 2017]. Retrieved from the Internet: URLhttps://en.wikipedia.org/wiki/Polyphase_matrix. 1 page.

Chennamangalam, Jayanth, 'Casper.berkeley.edu' [online]. "The Polyphase Filter Bank Technique," Oct. 2016, [retrieved on Feb. 16, 2017]. Retrieved from the Internet: URLhttps://casper.berkeley.edu/wiki/The_Polyphase_Filter_Bank_Technique. 1 page.

Hosking, Rodger, "Putting FPGAs to Work in Software Radio Systems," Pentek, Inc., Aug. 2012, 6: 1-72.

Navarro, Álvaro Palomo, "Channelization for Multi-Standard Software-Defined Radio Base Stations," National University of Ireland Maynooth, Oct. 2001, 277 pages.

Pucker, Lee, "Channelization Techniques for Software Defined Radio," Spectrum Signal Processing Inc., Nov. 2003, 6 pages.

* cited by examiner

RADIO RECEIVER WITH HYBRID CHANNELIZER ARCHITECTURE

BACKGROUND

Frequency-division multiple access (FDMA) allows information to be transmitted on multiple frequency channels simultaneously. An FDMA receiver receives a wideband signal that includes information encoded on the frequency channels, which each occupy a different frequency band. The FDMA receiver then decodes the information encoded on one or more of the frequency channels.

SUMMARY

In some implementations, a radio receiver includes a hybrid channelizer architecture. For example, an FDMA receiver can include a first channelizing stage that includes multiple polyphase fast Fourier transform (FFT) channelizers, and also include a second channelizing stage that includes multiple second stage mixing, filtering, and rate adjustment modules. The hybrid channelizer architecture may reduce hardware resource requirements and computational demands relative to traditional channelizers. At the same time, the architecture overcomes limitations of polyphase filter banks to allow the flexible selection for carrier frequencies and symbol rates for a large number of wireless channels.

In the first stage of the receiver, multiple polyphase filter banks can each divide a sampled wideband signal into a series of frequency sub-bands. The sampled signal can be frequency shifted so that each of the filter banks receives the signal with a different frequency offset. As a result, different filter banks produce outputs for sub-bands having different frequency offsets. This creates overlap among the sub-bands of different filter banks, which allows the receiver increased flexibility in selecting which sub-bands to assign to the frequency channels. If certain bandwidth constraints are satisfied, a channel with any arbitrary center frequency in a range can be decoded. Additionally, the filter banks efficiently perform processing at the high sample rate of the sampled wideband signal, and provide a signal with a lower sampling rate for further processing. The reduced sample rate reduces the amount of processing required for the second stage channelizer modules, which can then fine-tune reception to account for, e.g., differences between a channel's center frequency and the frequency of the filter bank sub-band used to decode the channel.

In one general aspect, a radio receiver includes: an input to receive a first signal encoding digital samples of a radiofrequency signal; a frequency shifter configured to generate a second signal that is frequency shifted relative to the first signal; a first polyphase filter bank configured to receive the first signal and provide filter bank outputs for first sub-bands, each of the first sub-bands having a passband; a second polyphase filter bank configured to receive the second signal and provide filter bank outputs for second sub-bands, wherein each of the second sub-bands has a passband that at least partially overlaps with at least one of the passbands of the first sub-bands; and a switch network configured to (i) select, for each channel of multiple channels, a filter bank output for a respective sub-band from among the first sub-bands and the second sub-bands, and (ii) provide the filter bank outputs for the respective sub-bands to respective digital channelizer modules for the multiple channels.

Implementations may include one or more of the following features. In some implementations, the radio receiver includes the digital channelizer modules, and each channelizer module includes a mixer, a low-pass filter, and a decimator. Each of the channelizer modules can providing baseband output for a different channel of the multiple channels.

In some implementations, the first polyphase filter bank divides the first signal into a plurality of equally-spaced sub-bands, and the second polyphase filter bank divides the second signal into a plurality of equally-spaced sub-bands.

In some implementations, the first sub-bands and the second sub-bands each have an equal bandwidth.

In some implementations, the radio receiver is configured to simultaneously decode signals from each of the multiple channels.

In some implementations, the switch network comprises switch network logic configured to dynamically vary the respective sub-bands selected for the multiple channels.

In some implementations, each of the first sub-bands and the second sub-bands has a sub-band center frequency. The switch network logic can be configured to: receive data indicating a channel center frequency for a particular channel of the multiple channels; and select, from among the first sub-bands and the second sub-bands, a particular sub-band that has a sub-band center frequency that is closest to the channel center frequency for the particular channel.

In some implementations, the radio receiver includes logic configured to determine a frequency difference between the channel center frequency for the particular channel and the sub-band center frequency for the particular sub-band; and a signal generator configured to generate a mixing signal based on the frequency difference and provide the mixing signal to the digital channelizer module for the particular channel.

In some implementations, the first sub-bands each have an equal bandwidth, and the frequency shifter includes a mixer configured to generate the second signal by mixing the first signal with a mixing signal having a frequency that is one half of a bandwidth of the first sub-bands.

In some implementations, the radio receiver includes at least four polyphase filter banks having sub-bands with equal bandwidth, and the radio receiver configured to provide input signals with equally-spaced frequency offsets to each of the at least four polyphase filter banks.

Advantageous implementations can include one or more of the following features. The hardware resource requirements of an FDMA receiver can be reduced by using multiple polyphase filter banks to process a sampled signal at a full sampling rate, and using additional channelizer modules to complete decoding. The power consumption of an FDMA receiver can be reduced, for example, by reducing the amount of processing required to be done at the full sampling rate of a wideband signal. The number of channels that an FDMA receiver can simultaneously receive can be increased. A single FDMA receiver can receive channels of different spacings, bandwidths, and data rates. An FDMA receiver can receive a channel having any carrier frequency within a reception range, and can accommodate channels with different symbol rates and sampling rates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
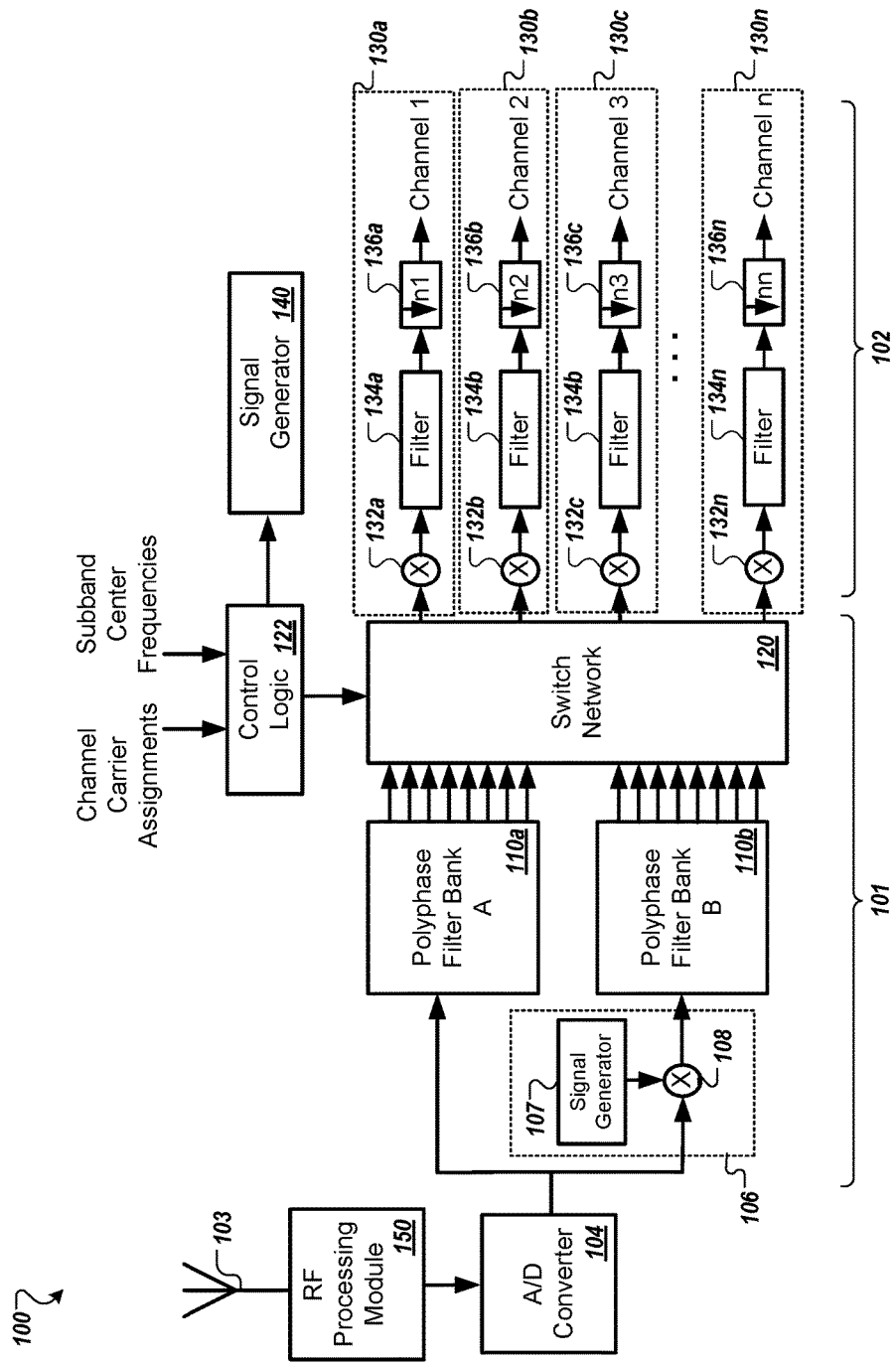
FIG. 1 is a diagram that illustrates an example of a radio receiver with a hybrid channelizer architecture.

FIG. 1 is a diagram that illustrates an example of a radio receiver 100 with a hybrid channelizer architecture. The radio receiver 100 includes a first channelizer stage 101 that includes multiple polyphase FFT filter banks 110a, 110b that process a sampled wideband signal at a high sampling rate. The radio receiver also includes a second channelizer stage 102 that includes multiple channelizer modules 130a-130n that operate at a lower sampling rate. By using the filter banks 110a, 110b as well as the channelizer modules 130a-130n, the hybrid design provides allows the receiver 100 to be implemented with reduced hardware requirements and power consumption, while also allowing flexibility in the carrier assignment for the channels and use of different symbol rates and sampling rates for different channels.

Some traditional channelizer designs have included an array of separate channelizer modules. Each channelizer module separately processes the samples of a wideband signal at the full sampling rate of the analog-to-digital (A/D) converter. In these designs, frequency conversion, anti-alias filtering, and rate reduction operations are performed for each individual frequency channel using a separate channelizer module in the array. This approach is generally very resource intensive, since the high sample rate processing of the channelizer modules requires a large silicon area for implementation. As a result, traditional channelizer modules operating the full sampling rate may require more space than is available on even the largest field programmable gate arrays (FPGAs). In addition, power consumption is also very high due to the need to process the incoming signal at the full sampling rate for each channel. The power and resource demands increase as the number of channels increases and as the frequency and the sampling rate increase.

Other designs have used a polyphase discrete Fourier transform (DFT) filter bank to filter a wideband signal into sub-bands for different channels. However, the sub-bands of a polyphase filter bank are generally required to be fixed, equally-spaced bands, and the output for each band has the same sampling rate. As a result, using a polyphase filter bank for channel decoding has generally been limited to uses where frequency channels use only predetermined, equally-spaced carrier frequencies, and where output having a single common sampling rate is desired.

The hybrid architecture of the radio receiver 100 overcomes limitations of both prior approaches with a two-stage design. The filter banks 110a, 110b of the first channelizer stage 101 can efficiently process a high-sample-rate input from an A/D converter 104 with lower hardware requirements and power consumption than traditional channelizer modules. The filter banks 110a, 110b reduce the sample rate significantly, allowing the channelizer modules 130a-130n to operate at lower rates, which requires less hardware and less power. In addition, the receiver 100 is not limited to placing carrier frequencies at the center frequencies of the sub-bands of the filter banks 110a, 110b. As long as the signal for a frequency channel is within the passband of at least one of the sub-bands, the information can be passed to an appropriate channelizer module 130a-130n to finish the decoding. To enhance the flexibility of the receiver 100, the filter banks 110a, 110b can divide the sampled wideband signal into staggered sets of sidebands, so that there is overlap between sidebands of different filter banks 110a, 110b. In some instances, due to the carrier frequency of a particular channel, a first filter bank 110a may not have any sub-band that includes the full frequency content for the particular channel. For example, a signal may extend beyond the bandwidth of one sub-band into another sub-band of the first filter bank 110a. Nevertheless, because the sub-bands of the second filter bank 110b overlap with and are offset from the sub-bands of the first filter bank 110a, one of the sub-bands of the second filter bank 110b will include the full frequency content for the particular channel and can be used for the decoding.

Referring again to FIG. 1, the receiver 100 receives an FDMA signal with an antenna 103. The received signal is then processed with an RF processing module 150 which may amplify, filter, or otherwise process the signal received by the antenna 103. The RF processing module may convert the received signal to an intermediate frequency using one or more downconversion stages. For example, a received signal from the Ku or Ka band may be downconverted to an intermediate frequency between about 500 MHz and 4 GHz. In some implementations, an intermediate frequency of about 2.5 GHz is used. The output of the RF processing module 150 can be an analog signal ready for A/D conversion.

The signal is then processed by an A/D converter 104, which generates a sampled signal that includes digital samples representing a wideband composite of all of the frequency channels to be received. To support a high data rates and large numbers of channels, a sampling rate can be used. For example, the sampling rate may be on the order of 1 Mhz, 10 Mhz, 100 Mhz, or more. In the example of FIG. 1, a sampling rate of approximately 400 MHz is used.

The received FDMA signal includes information encoded onto multiple carrier frequencies. The information encoded on each carrier frequency corresponds to a different frequency channel. The received signal may include, for example, signals for dozens or hundreds of different channels to be decoded by the receiver 100. The carrier frequencies are not required to be equally spaced, and are not required to have the same symbol rate or bandwidth. The assignment of carrier frequencies, symbol rates, and bandwidths can change dynamically over time. In some implementations, channel carrier frequencies are required to be within a specified range of frequencies, and the bandwidth of each individual channel is set to be less than or equal to a maximum bandwidth. In some implementations, the receiver 100 is configured to receive signals with carrier frequencies in the Ka-Band (e.g., 26.5-40 GHz), Ku-Band (e.g., 12-18 GHz), or C-Band (e.g., 4-8 GHz). The disclosed techniques can be used to receive and decode signals in other bands also.

The sampled signal from the A/D converter 104 is provided to the first channelizer stage 101, which includes at least one frequency shifter 106, multiple polyphase FFT filter banks 110a, 110b, and a switch network 120. In the first channelizer stage 101, the sampled signal is provided to the filter banks 110a, 110b with different frequency offsets. For example, the first filter bank 110a receives the sampled signal as provided by the A/D converter 104, and the second filter bank 110b receives a frequency-shifted version of the sampled signal.

The frequency shifter 106 can generate the frequency-shifted version of the sampled signal using, for example, a mixer 108 that mixes the sampled signal with a mixing signal from a signal generator 107. The frequency of the mixing signal is the amount that the sampled signal will be shifted. The amount of frequency shift, and thus the frequency of the mixing signal, is related to the characteristics of the filter banks 110a, 110b. The mixing signal can be determined based on a number of factors, such as the sample rate of the A/D converter, the number of sub-bands for each filter bank 110a, 110b, the number of filter banks 110a, 110b used, and the amount of overlap desired among sub-bands of the filter banks 110a, 110b.

As an example, the A/D converter 104 can produce samples at a rate of 400 MHz, and each of the filter banks can divide the spectrum into 8 different sub-bands. Each sub-band of the filter banks 110a, 110b would then have a bandwidth of 50 Mhz. To offset the sub-bands of the filter banks 110a, 110b by one half of the sub-band bandwidth, 25 MHz can be used as the mixing signal. In some implementations, more than two filter banks are used, and multiple different frequency-shifted versions of a received signal are generated. For example, if four filter banks are used, the inputs to the filter banks can be spaced apart by 12.5 Mhz. To achieve this, the inputs to the four filter banks could respectively have frequency shifts of 0 MHz, 12.5 MHz, 25 MHz, and 37.5 MHz. In general, a frequency offset, $F_{offset}$, between the inputs to the filter banks in the first channelizer stage 101 can be given by Equation 1 below:

$$F_{offset} = R_{sample}(N_{sub} * N_{banks})$$ Equation 1 where $R_{sample}$ represents the sample rate of the A/D converter, $N_{sub}$ represents the number of sub-bands per filter bank, and $N_{banks}$ represents the number of filter banks in the first channelizer stage 101. The mixing signals used can be multiples of the frequency offset value, e.g., with the first filter bank having no offset, the second filter bank having an offset of $F_{offset}$, the third filter bank having an offset of $2 * F_{offset}$, and so on. In this manner, the inputs to each of the filter banks are equally spaced apart.

The filter banks 110a, 110b each divide the same spectrum into a continuous series of sub-bands having equally-spaced center frequencies and equal bandwidths. In some implementations, the filter banks 110a, 110b can be identical. Because the input to the filter bank 110b is frequency-shifted relative to the input to the filter bank 110a, the sub-bands of the filter bank 110b include different segments of the frequency content of the received signal. Examples of sub-bands of the filter banks 110a, 110b are shown in FIGS. 2A and 2B.

Figure 2A:
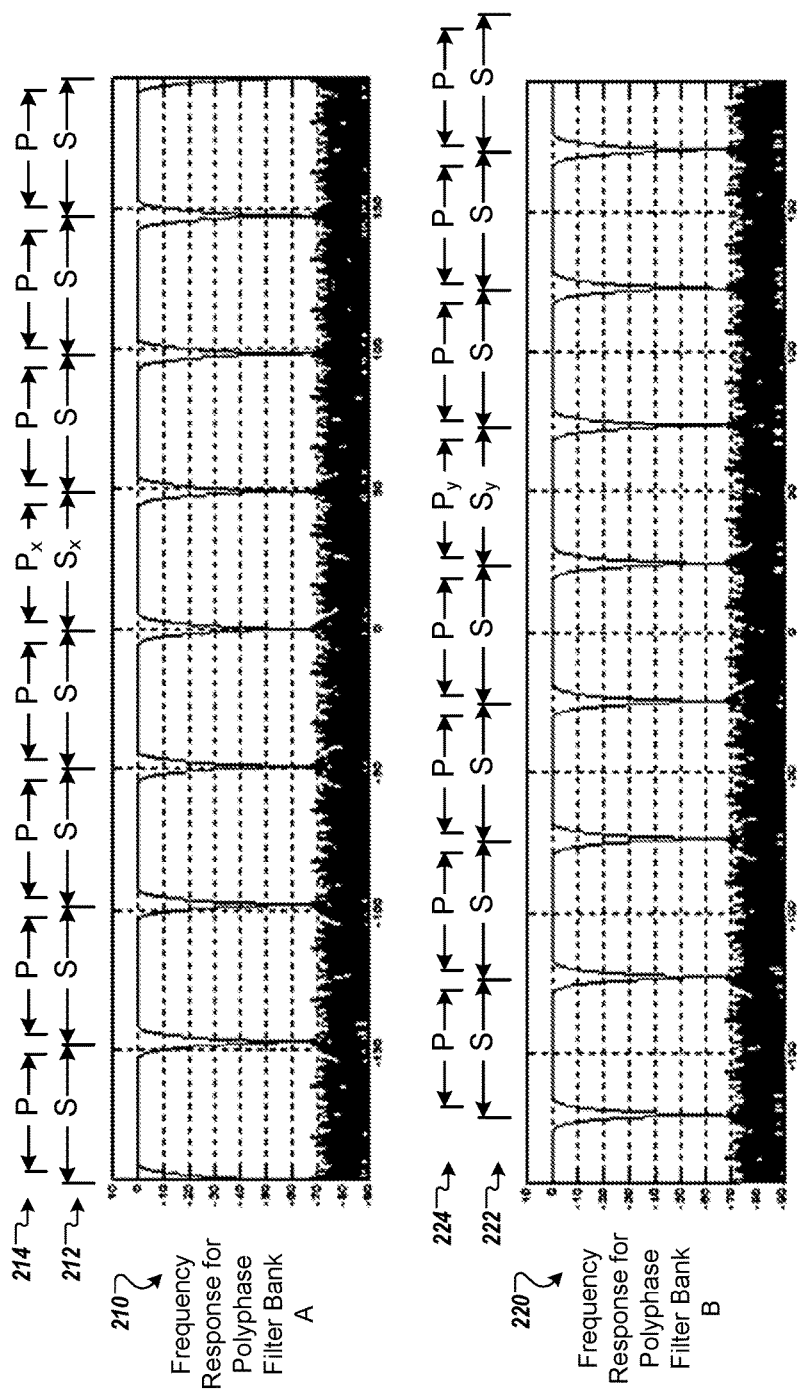
FIGS. 2A and 2B are diagrams that illustrate frequency responses of filter banks of the radio receiver.
Figure 2B:
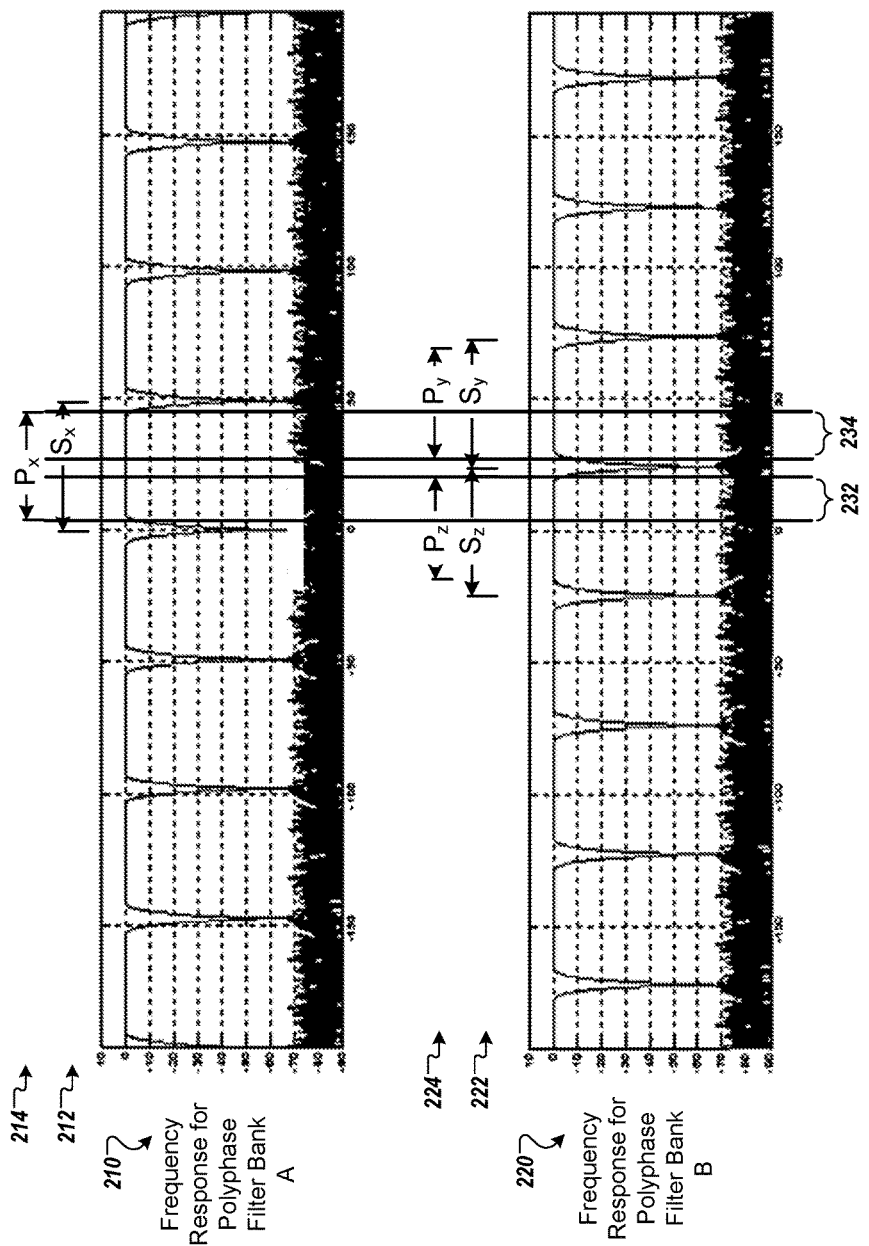

FIG. 2A illustrates examples of frequency responses of filter banks 110a, 110b of FIG. 1. The figure includes a first chart 210 that shows the frequency response of the first filter bank 110a, and a second chart 220 that shows the frequency response of the second filter bank 110b. In each chart 210, 220, the vertical axis indicates log-magnitude of signal response in decibels (dB), and the horizontal axis indicates frequency range centered around 0 Hz.

As shown in FIG. 2A, the first filter bank 110a divides the input spectrum into a series of first sub-bands 212. Each first sub-band 212 indicates the frequency response for a different filter of the first filter bank 110a. The first sub-bands 212 are adjacent, equal-bandwidth frequency bands. Each first sub-band 212 has a corresponding passband 214. The passband 214 represents the frequency range within a first sub-band 212 for which signals are passed with no more than a maximum amount of attenuation. For example, the passbands 214 can each indicate a frequency range that is passed with no more than a −3 dB change in magnitude.

The second filter bank 110b divides its input into a series of second sub-bands 222. Each second sub-band 222 indicates the frequency response for a different filter of the second filter bank 110b. The second sub-bands 222 are adjacent, equal-bandwidth frequency bands. Each second sub-band 222 has a corresponding passband 224. The passband 214 represents the frequency range within a second sub-band 222 for which signals are passed with no more than a maximum amount of attenuation. For example, the passbands 224 can each indicate a frequency range that is passed with no more than a −3 dB change in magnitude.

The first sub-bands 212 and the second sub-bands 222 are offset from each other due to the frequency offset between the input to the first filter bank 110a and the input to the second filter bank 110b. For proper decoding of a channel, the frequency content for the channel should fall completely within one of the passbands 214, 224. If a channel is located at an edge of a sub-band, so that some of the frequency content is attenuated or extends into an adjacent sub-band, the symbol will be clipped and will not be recoverable with that sub-band. As a result, there are certain carrier frequencies that cannot be used with certain filter banks.

For example, the first sub-bands 212 include a sub-band $S_x$ centered at about 25 MHz, having a bandwidth of approximately 50 MHz. The passband $P_x$ for sub-band $S_x$ extends approximately from 5 MHz to 45 MHz. As a result, the sub-band $S_x$ could be used to recover information in a channel that centered at 25 MHz and a bandwidth of 20 MHz, or a channel centered at 35 MHz and a bandwidth of 10 MHz. However, a channel with a bandwidth of 10 MHz centered at 40 MHz, 45 MHz, or 50 MHz would extend outside the passband $P_x$, to the edge of the sub-band $S_x$ where significant portions of the signal would be attenuated and/or would extend into an adjacent sub-band. The information in a channel with these characteristics could not be recovered with any of the first sub-bands 212. However, the second sub-bands 222 include a sub-band $S_y$ that extends from approximately 25 MHz to 75 MHz, with a passband $P_y$ of about 30 MHz to 70 MHz. A channel with a bandwidth of 10 MHz centered at 40 MHz, 45 MHz, or 50 MHz could be recovered using this sub-band $S_y$, since the spectrum would fall completely within the passband $P_y$ for the sub-band $S_y$. Thus, the staggered placement of the first sub-bands 212 and the second sub-bands 222 allows a much greater range of carriers to be decoded. Any channel spectrum that falls completely within one of the first passbands 214 or the second passbands 224 can be decoded by the receiver 100.

FIG. 2B also illustrates examples of frequency responses of filter banks 110a, 110b of FIG. 1. The charts 210, 220 of FIG. 2A are included, and indicators h show examples of overlapping regions 233, 234 between the passband $P_x$ of one of the first sub-bands 212, e.g., sub-band $S_x$, with the respective passbands $P_y$ and $P_z$ of overlapping second sub-bands 222, e.g., sub-bands $S_y$ and $S_z$. In general, the first sub-bands 212 and second sub-bands 222 have the same bandwidth and are offset by one half the sub-band bandwidth. However, because of the attenuation at the edges of each sub-band 212, 222, the overlap between the passbands 214, 224 is less than half the bandwidth, approximately 20

MHz. This overlap between the passbands 214, 224 defines sets the maximum bandwidth that a channel spectrum can have while still being recoverable at any arbitrary carrier placement. That is, the receiver 100 can decode a channel having a bandwidth of 20 MHz or less placed at any arbitrary carrier placement in a roughly 400 MHz band. However, a channel with a bandwidth of greater than 20 MHz cannot be guaranteed to be recoverable at any arbitrary carrier frequency in the range, since a portion of the signal may be attenuated or clipped at a sub-band boundary for certain carrier frequencies.

In some implementations, additional filter banks may be included in the first channelizer stage 101 to increase the amount of overlap between passbands for different filter banks, which can increase the maximum amount of bandwidth that a channel spectrum can have while still allowing arbitrary carrier selection. For example, with four filter banks having equally staggered sets of sub-bands, each sub-band would overlap with three quarters of a sub-band from another filter bank. Assuming a sub-band bandwidth of 50 MHz and an unusable 5 MHz edge at each end, this arrangement would still cause each passband to overlap with another passband by 32.5 MHz. Compared to a receiver with two filter banks, the use of four filter banks allows a greater maximum bandwidth for individual channels, in exchange for the hardware and power cost of adding two additional filter banks.

Referring again to FIG. 1, the outputs of the filter banks 110a, 110b are provided to a switch network 120. In the example, each filter bank 110a, 110b provides an output for each of eight different sub-bands. The switch network 120 selects from among the filter bank outputs, e.g., from among the sixteen inputs to the switch network 120, and assigns the filter bank outputs to the respective channels. Each channel receives an assignment of one of the filter bank outputs. Since the spectra for multiple channels may potentially be within a single sub-band, the same filter bank output may be assigned to multiple different channels. The number of filter bank outputs does not necessarily correspond to the number of channels received by the receiver 100. The receiver 100 may receive more or fewer channels than the number of filter bank outputs that the switch network 120 can select among.

In some implementations, the carrier frequencies corresponding to channels may vary dynamically, for example, as symbol rates change, as more or fewer channels are used, or as interference patterns change. The receiver 100 includes control logic 122 to determine the appropriate carrier frequency for each channel at any given time. The carrier frequency assignments may be accessed from data storage, received from another element of the receiver 100, or in some implementations, calculated by the control logic 122. Information about the center frequencies for the sub-band corresponding to each filter bank output can also be received or calculated by the control logic 122.

The control logic 122 also determines which filter bank output is most appropriate for each particular channel, then causes the switch network 120 to pass the determined output on for decoding of that channel. The control logic 122 assigns each channel to receive the filter bank output for a sub-band having the center frequency closest to the carrier frequency of the channel. The control logic 122 can dynamically select a new filter bank output for a channel in response to a change in the assigned carrier frequency of the channel, or based on other information. Even when multiple filter bank outputs include the full spectrum for a channel, the filter bank output for a sub-band with a center frequency closest to the channel's carrier frequency is preferred, since ripple in the filter response increases close to the sub-band's edge.

The switch network 120 passes the filter bank outputs on to the second channelizer stage, which includes a separate channelizer module 130a-130n for each channel received by the receiver 100. Each channelizer module 130a-130n receives a single filter bank output as input through the switch network 120. Each channelizer module 130a-130n includes a mixer 132a-132n, a filter 134a-134n, and a decimator 136a-136n, which cooperate to provide a baseband output for each channel.

The mixers 132a-132n each fine-tune the reception for an individual channel by shifting the respective filter bank output spectrum received through the switch network 120. Because the filter bank outputs are often at center frequencies different from the carrier frequencies of the channels being received, the mixers 132a-132n each mix their corresponding inputs with a respective mixing signal to compensate. The mixing signal for a channel is a signal at a frequency equal to the difference between the carrier frequency of the channel and the center frequency of the filter bank sub-band that was assigned to the channel. The control logic 122 determines the respective frequency difference for each channel, and causes the signal generator 140 to produce the respective mixing signal for each channel.

The output of the mixers 132a-132n is then low-pass filtered with an appropriate filter 134a-134n. In some implementations, the filters 134a-134n are programmable low-pass filters, and the control logic 122 sets the bandwidth of the filters 134a-134n based on the bandwidth of the spectrum for the channel. For example, each of multiple different symbol rates can have a different corresponding bandwidth. The control logic 122 can determine which symbol rate is assigned to each channel, determine the appropriate bandwidths corresponding to the respective symbol rates, and set the filters 134a-134n to apply a bandwidth corresponding to the symbol rates of their respective channels.

After filtering, the sample rate for each channel can be reduced using a decimator 136a-136n. Since each channel is filtered and decimated separately, the receiver 100 can provide outputs with different symbol rates and sample rates for different channels. After decimation, the resulting samples can be provided as baseband outputs for the respective channels.

In the channelizer modules 130a-130n, each block may be implemented in one or more stages. For example, each filter 134a-134n or decimator 136a-136n may be represent multiple elements that perform the functions over multiple stages.

Figure 3:
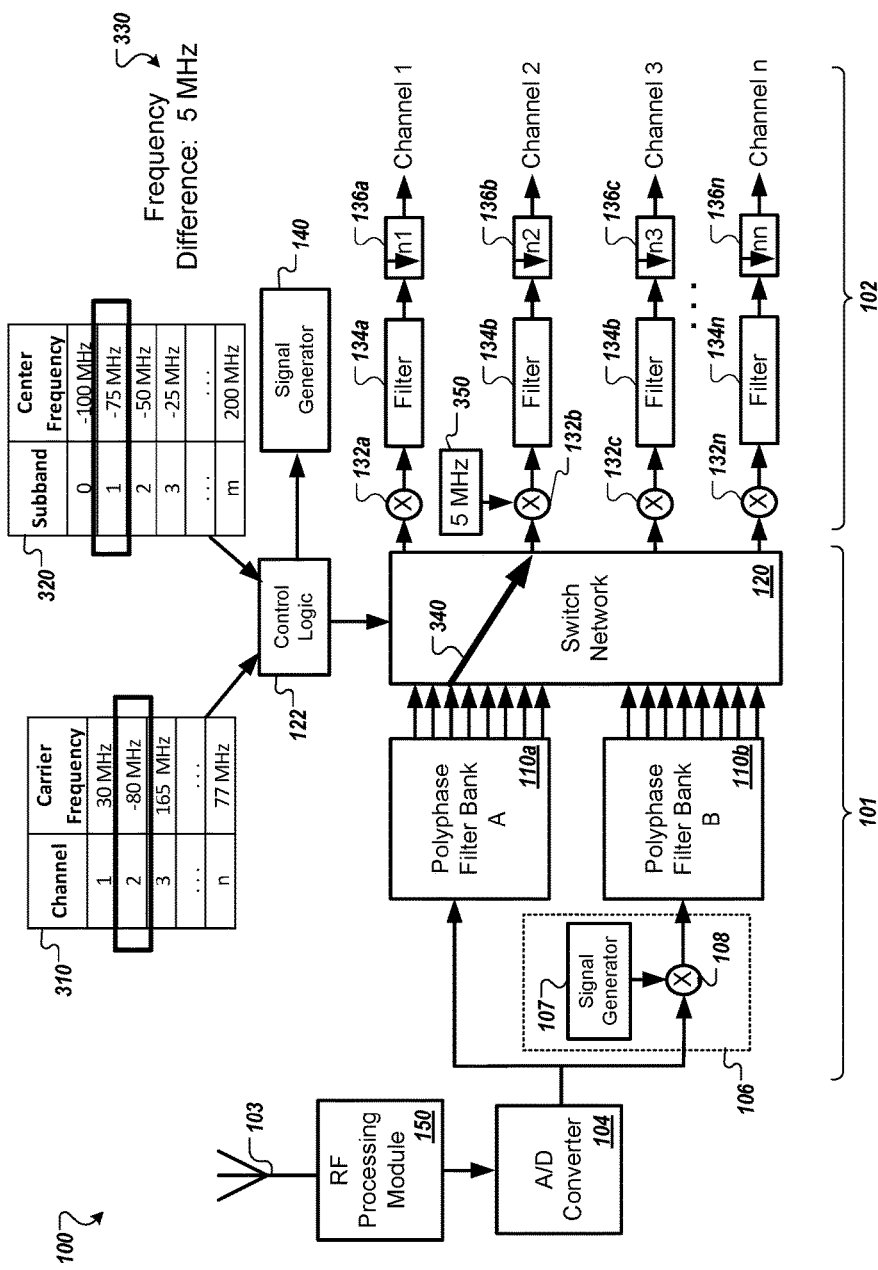
FIG. 3 is a diagram that illustrates another example of the radio receiver

FIG. 3 is a diagram that illustrates another example of the radio receiver 100. The example of FIG. 3 shows an example technique for assigning a filter bank output to a channel and determining a mixing signal for the channel. In FIG. 2 various operations to decode the information for channel 2 are illustrated. Similar operations can be done in parallel for the remainder of the channels.

To determine which filter bank output to assign to the channelizer module for channel two, the control logic 122 accesses data 310 indicating carrier frequencies of the channels. The data 310 can be, for example, a look-up table, a message from another processing element of the receiver 100, dynamically calculated values, and so on. For simplicity in illustration, the carrier frequencies shown represent differences between the carrier frequency and a reference frequency. For example, the center frequency of the intermediate frequency signal may be 2.5 GHz, and the downconverted carrier frequency for channel two may be 2.42 GHz, resulting in a frequency of −80 MHz in the A/D converted samples. The control logic 122 identifies this carrier frequency value from the data 310.

The control logic 122 also accesses data 320 indicating the center frequencies of the respective sub-bands of the filter banks 110a, 110b. The sub-band center frequencies represent positions relative to the intermediate frequency, e.g., with sub-band 0 being centered at a frequency −100 MHz less than the intermediate frequency. While illustrated as a table, the data 320 may be accessed or received in any appropriate form, or may be dynamically calculated by the control logic 122. The control logic 122 determines that the sub-band labeled "1" has a center frequency closest to the carrier frequency of channel two. As one example, the control logic 122 can subtract the value of the carrier frequency for channel two from the various sub-band center frequencies and identify which difference has a magnitude that is smallest. Having identified the sub-band "1" as the closest sub-band to the spectrum for channel two, the control logic 122 causes the switch network to pass the filter bank output for that sub-band to the channelizer module for channel two. For example, the switch network 120 makes a connection 340 between the indicated filter tap and the channelizer module for channel two.

Figure 4:
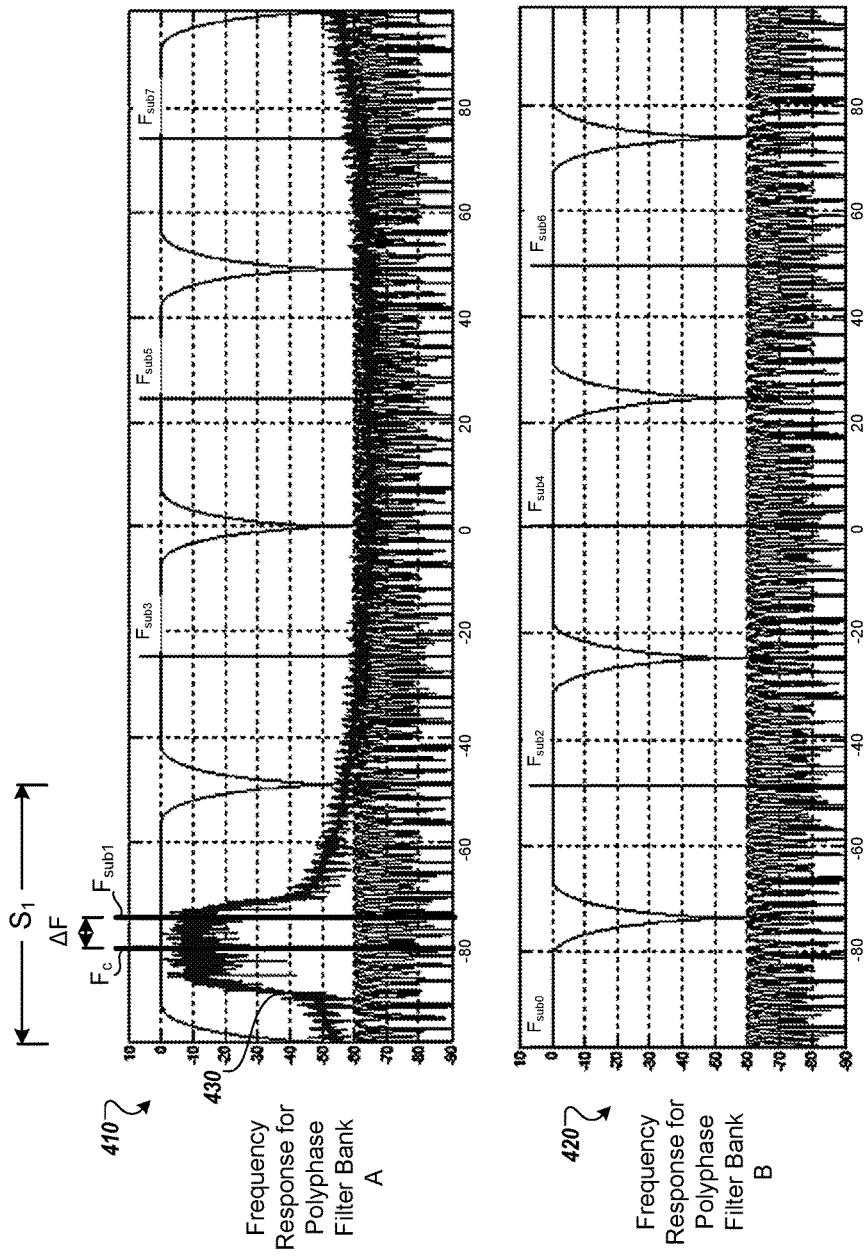
FIG. 4 is a diagram of an example spectrum received using the radio receiver.

The control logic 122 determines the frequency difference 330 between the carrier frequency of channel two and the center frequency for the selected sub-band. In the illustrated example, the frequency difference 330 is 5 MHz. FIG. 4 illustrates graphs 410, 420 which respectively indicate the frequency response of the filterbanks 110a, 110b. The vertical axes represent signal strength in log magnitude, and the horizontal axes represent frequency in MHz. This frequency on the horizontal axis can represent a frequency offset or relative frequency with respect to the intermediate frequency, e.g., with 0 MHz representing a frequency equal to the intermediate frequency. FIG. 4 also shows the frequency domain spectrum 430 for channel two, along with the carrier frequency $F_c$ of about −80 MHz, as well as the sub-band Si and its center frequency, $F_{sub1}$, of −75 MHz. The difference between the two frequencies, shown by ΔF, represents the 5 MHz difference determined in FIG. 3. While not illustrated in FIG. 4 for clarity, signals for other frequency channels, including multiple channels within a single sub-band, can be simultaneously received and processed with the receiver 100. For each channel being received, an appropriate sub-band can be selected and an appropriate frequency difference from the selected sub-band can be determined.

Referring again to FIG. 3, the control logic 122 causes the signal generator 140 to generate a mixing signal 350 having a frequency equal to the frequency difference 330 of 5 MHz. This mixing signal 350, when mixed with the filter bank output selected, shifts the frequency of the filter bank output to compensate for the difference between the carrier frequency for the carrier and the center frequency for the sub-band.

In some implementations, the receiver 100 may be used in a terrestrial gateway for communication with a satellite network. The system may be designed to support varying numbers and placements of channel carrier frequencies. The system may also be designed to support varying symbol rates, e.g., 512k, 1M, 2M, or 4M symbols per second, with each symbol rate having a different spectral shape. The flexibility to assign channels to arbitrary carrier frequencies within a range can allow the network to maximize the number of channels used simultaneously while managing the spectra to place the carriers far enough apart to avoid interference. In some implementations, the first channelizer stage 101 and/or the second channelizer stage 102 are implemented on a single field programmable gate array (FPGA).

Figure 5:
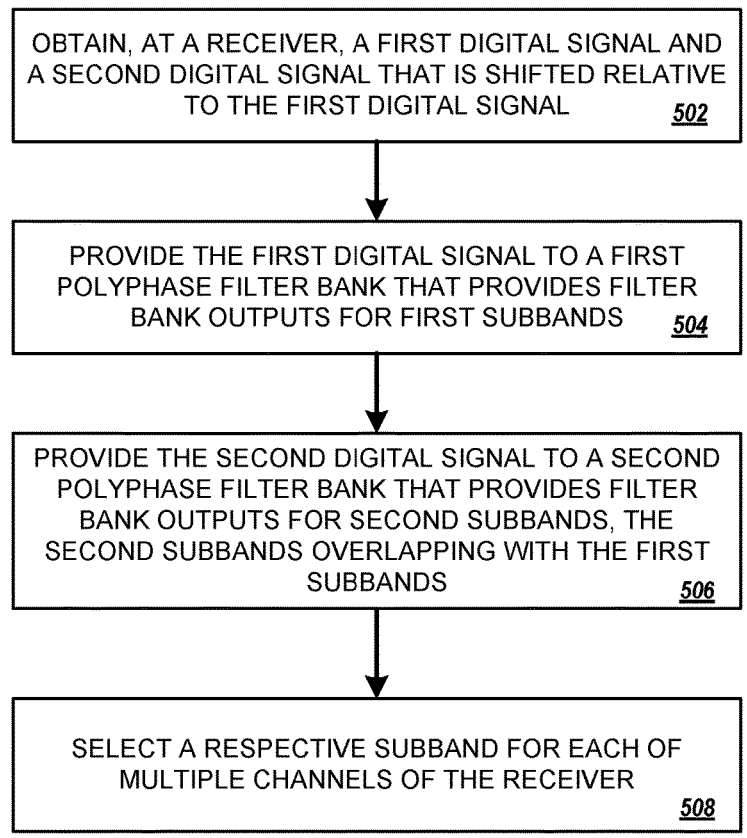
FIG. 5 is a flow diagram illustrating an example of a process for receiving a signal using a radio receiver with a hybrid channelizer architecture.

FIG. 5 is a flow diagram that illustrates an example of a process 500 for receiving a signal using a radio receiver with a hybrid channelizer architecture.

A first digital signal and a second digital signal are obtained (502). The first digital signal and the second digital signal can represent samples of a wideband signal received by a radio receiver. The second digital signal is frequency shifted with respect to the first digital signal. The second signal can be generated by mixing the first signal with a mixing signal. For example, when two filter banks are used, the mixing signal can have a frequency that is one half of a bandwidth of sub-bands of the filter banks. When four filter banks are used, the mixing signal can have a frequency that is one fourth of a bandwidth of sub-bands of the filter banks. When three polyphase filter banks are used, the mixing signal can have a frequency that is one third of the bandwidth of the sub-bands of the filter banks.

The first digital signal is provided to a first polyphase filter bank of the receiver (504). The first polyphase filter bank provides filter bank outputs for first sub-bands. Each of the first sub-bands has a different corresponding passband. The first polyphase filter bank can divide the first signal into a plurality of equally-spaced sub-bands. The division can be performed so that the sub-bands from the same polyphase filter bank do not overlap with each other.

The second digital signal is provided to a second polyphase filter bank of the receiver (506). The second polyphase filter bank provides filter bank outputs for second sub-bands. Each of the second sub-bands has a different corresponding passband, and each of the passbands at least partially overlaps with at least one of the passbands of the first sub-bands. The second polyphase filter bank can divide the second signal into a plurality of equally-spaced sub-bands. The second sub-bands can each have a bandwidth equal to the bandwidth of the first sub-bands. The second sub-bands can include sub-bands of a received wideband signal that are offset from the frequency sub-bands of the wideband signal of the first sub-bands.

A respective sub-band is selected for each of multiple channels of output by the receiver, from among the first sub-bands and the second sub-bands (508). For example, a respective filter bank output for each channel is provided to a digital channelizer module for the channel. To select the sub-bands, the respective sub-bands selected for the multiple channels can be dynamically varied while reception is ongoing.

In some implementations, a baseband output is generated for each of the multiple channels using a plurality of digital channelizer modules. Each digital channelizer module includes a mixer, a low-pass filter, and a decimator, and each digital channelizer generates a baseband output for a separate channel. In some implementations, the receiver is used to simultaneously decode signals from each of the multiple channels.

In some implementations, each of the first sub-bands and the second sub-bands has a sub-band center frequency. Data indicating a channel center frequency, e.g., channel carrier frequency, for a particular channel of the multiple channels is received. To select the sub-band for the particular channel, a particular sub-band can be selected which has a sub-band center frequency that is closest to the channel center frequency for the particular channel. The receiver can determine a frequency difference between the channel center frequency for the particular channel and the sub-band center frequency for the particular sub-band. Then the receiver can generate a mixing signal based on the frequency difference, and provide the mixing signal to a channelizer module for the particular channel.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A radio receiver comprising:
   an input to receive a first signal encoding digital samples of a radiofrequency signal;
   a frequency shifter configured to generate a second signal that is frequency shifted relative to the first signal;
   a first polyphase filter bank configured to receive the first signal and provide filter bank outputs for a first plurality of sub-bands, each of the first plurality of sub-bands having a passband;
   a second polyphase filter bank configured to receive the second signal and provide filter bank outputs for a second plurality of sub-bands, wherein each of the second plurality of sub-bands has a passband that at least partially overlaps with at least one of the passbands of the first plurality of sub-bands;
   a switch network configured to (i) select, for each channel of multiple channels, a filter bank output for a respective sub-band from among the first plurality of sub-bands and the second plurality of sub-bands, and (ii) provide the filter bank outputs for the respective sub-bands to respective digital channelizer modules for the multiple channels, wherein the switch network is operable to vary which sub-bands are selected for the multiple channels;
   control logic configured to (i) receive data indicating a channel center frequency for a particular channel of the multiple channels, (ii) select, from among the first plurality of sub-bands and the second plurality of sub-bands, a particular sub-band that has a sub-band center frequency that is closest to the channel center frequency for the particular channel, and (iii) determine a frequency difference between the channel center frequency for the particular channel and the sub-band center frequency for the particular sub-band; and
   a signal generator configured to generate a mixing signal based on the frequency difference and provide the mixing signal to the digital channelizer module for the particular channel.

2. The radio receiver of claim 1, further comprising the digital channelizer modules, each channelizer module comprising a mixer, a low-pass filter, and a decimator, each of the channelizer modules providing baseband output for a different channel of the multiple channels.

3. The radio receiver of claim 1, wherein the first polyphase filter bank divides the first signal into a first plurality of equally-spaced sub-bands, and
wherein the second polyphase filter bank divides the second signal into a second plurality of equally-spaced sub-bands.

4. The radio receiver of claim 3, wherein the sub-bands in the first plurality of sub-bands and the second plurality of sub-bands each have an equal bandwidth.

5. The radio receiver of claim 1, wherein the radio receiver is configured to simultaneously decode signals from each of the multiple channels.

6. The radio receiver of claim 1, wherein the first sub-bands each have an equal bandwidth, and the frequency shifter includes a mixer configured to generate the second signal by mixing the first signal with a mixing signal having a frequency that is one half of a bandwidth of the first sub-bands.

7. The radio receiver of claim 1, wherein the radio receiver includes at least four polyphase filter banks having sub-bands with equal bandwidth, and the radio receiver configured to provide input signals with equally-spaced frequency offsets to each of the at least four polyphase filter banks.

8. The radio receiver of claim 1, wherein the switch network is operable to concurrently provide a filter bank output, from among the filter bank outputs of the first plurality of sub-bands and the second plurality of sub-bands, to digital channelizer modules for different channels of the multiple channels.

9. The radio receiver of claim 1, wherein the control logic is configured to change which filter bank output is selected for a first channel of the multiple channels in response to a change in the assigned carrier frequency of the first channel.

10. The radio receiver of claim 1, wherein the sub-bands each have a passband that is at least twice the bandwidth of the channels in the multiple channels.

11. A method comprising:
obtaining, from a radiofrequency signal received at a receiver, a first digital signal and second digital signal that is frequency shifted with respect to the first digital signal;
providing the first digital signal to a first polyphase filter bank that provides filter bank outputs for a first plurality of sub-bands, each of the sub-bands in the first plurality of sub-bands having a passband;
providing the second digital signal to a second polyphase filter bank that provides filter bank outputs for a second plurality of sub-bands, wherein each of the sub-bands in the second plurality of sub-bands has a passband that at least partially overlaps with at least one of the passbands of the first sub-bands; and
selecting, for each of multiple channels of output by the receiver, a respective sub-band from among the first plurality of sub-bands and the second plurality of sub-bands using switch logic operable to vary which sub-bands are selected for the multiple channels, wherein the selecting comprises:
determining a channel center frequency for a particular channel of the multiple channels; and
selecting, for the particular channel from among the first plurality of sub-bands and the second plurality of sub-bands, a particular sub-band that has a sub-band center frequency that is closest to the channel center frequency for the particular channel;
determining a frequency difference between the channel center frequency for the particular channel and the sub-band center frequency for the particular sub-band;
generating, a mixing signal based on the frequency difference; and
providing, the mixing signal and the filter bank output for the particular sub-band to a channelizer module for the particular channel.

12. The method of claim 11, further comprising generating a baseband output for each of the multiple channels using a plurality of digital channelizer modules, each digital channelizer module comprising a mixer, a low-pass filter, and a decimator.

13. The method of claim 11, further comprising:
dividing the first signal into a first plurality of equally-spaced sub-bands using the first polyphase filter bank; and
dividing the second signal into a second plurality of equally-spaced sub-bands using the second polyphase filter bank.

14. The method of claim 13, wherein the sub-bands in the first plurality of sub-bands and the second plurality of sub-bands each have an equal bandwidth.

15. The method of claim 11, further comprising simultaneously decoding, by the receiver, signals from each of the multiple channels.

16. The method of claim 11, wherein the sub-bands in the first plurality of sub-bands each have an equal bandwidth, and wherein the method further comprises:
generating the second signal by mixing the first signal with a mixing signal having a frequency that is one half of a bandwidth of the first sub-bands.

17. The method of claim 11, wherein the selecting comprises selecting a same filter bank output, from among the first plurality of sub-bands and the second plurality of sub-bands, for at least two of the multiple channels.

18. One or more non-transitory machine-readable storage media storing instructions that when executed by one or more processors cause the one or more processors to perform operations comprising:
obtaining, from a radiofrequency signal received at a receiver, a first digital signal and second digital signal that is frequency shifted with respect to the first digital signal;
providing the first digital signal to a first polyphase filter bank that provides filter bank outputs for a first plurality of sub-bands, each of the sub-bands in the first plurality of sub-bands having a passband;
providing the second digital signal to a second polyphase filter bank that provides filter bank outputs for a second plurality of sub-bands, wherein each of the sub-bands in the second plurality of sub-bands has a passband that at least partially overlaps with at least one of the passbands of the first sub-bands;
selecting, for each of multiple channels of output by the receiver, a respective sub-band from among the first plurality of sub-bands and the second plurality of sub-bands using switch logic operable to vary which sub-bands are selected for the multiple channels, wherein the selecting comprises:
determining a channel center frequency for a particular channel of the multiple channels; and
selecting, for the particular channel from among the first plurality of sub-bands and the second plurality of sub-bands, a particular sub-band that has a sub-band center frequency that is closest to the channel center frequency for the particular channel;

determining a frequency difference between the channel center frequency for the particular channel and the sub-band center frequency for the particular sub-band;

generating, a mixing signal based on the frequency difference; and providing, the mixing signal and the filter bank output for the particular sub-band to a channelizer module for the particular channel.

* * * * *